(12) United States Patent
White et al.

(10) Patent No.: US 10,688,713 B1
(45) Date of Patent: Jun. 23, 2020

(54) SYSTEMS AND METHODS FOR REHABILITATING, REPAIRING, AND REPLACING MANHOLES AND CONNECTED SEWER LINES

(71) Applicant: Quercus Financial, LLC, Dallas, TX (US)

(72) Inventors: Jim White, Dallas, TX (US); Edward Rau, Fort Worth, TX (US)

(73) Assignee: Resinating LLC, Dallas, TX (US)

( * ) Notice: Subject to any disclaimer, the term of this patent is extended or adjusted under 35 U.S.C. 154(b) by 0 days.

(21) Appl. No.: 16/369,261

(22) Filed: Mar. 29, 2019

(51) Int. Cl.
*B29C 63/26* (2006.01)
*B29C 63/34* (2006.01)
*E03F 5/02* (2006.01)
*E02D 29/12* (2006.01)

(52) U.S. Cl.
CPC .......... *B29C 63/341* (2013.01); *E02D 29/125* (2013.01); *E03F 5/025* (2013.01)

(58) Field of Classification Search
CPC .. B29C 63/341; E03F 5/025; E03F 2005/028; E02D 29/125; B65D 90/10
See application file for complete search history.

(56) References Cited

U.S. PATENT DOCUMENTS

| | | |
|---|---|---|
| 5,002,438 A | 3/1991 | Strong |
| 5,490,744 A | 2/1996 | McNeil |
| 5,608,998 A | 3/1997 | Hume |
| 5,879,501 A | 3/1999 | Livingston |
| 6,018,914 A * | 2/2000 | Kamiyama ............. B29C 63/34 52/20 |
| 2016/0178108 A1* | 6/2016 | Ehsani .................... B29C 43/18 138/98 |
| 2018/0050485 A1* | 2/2018 | Wallin .................. B29C 63/341 |

OTHER PUBLICATIONS

"HOBAS Manhole Rehabilitation" available at https://www.youtube.com/watch?v=-nZ29M7SBe8 (last visited on Jun. 6, 2019). The video shows shaft rehabilitation of a manhole and was published on Feb. 20, 2012.

* cited by examiner

*Primary Examiner* — Patrick J Maestri
(74) *Attorney, Agent, or Firm* — Regitz Mauck PLLC; Dustin Mauck; Mike Regitz (57) ABSTRACT

The present invention is a method for rehabilitating, repairing, and replacing manholes and connected sewer lines. In some embodiments, a compressed liner is inserted through the manhole access hole or the connected sewer lines. Prior to insertion, the liner may be cut and/or folded to be compressed to a size that can fit through the manhole opening or the sewer lines. Once inserted in the manhole or sewer lines, the liner should be expanded, and if necessary, bonded together with a resin along the separation line. Next, a bonding material may be injected between the liner and a surface of the manhole or sewer line to seal any cracks or fissures in the brick or concrete wall and to seal the liner against the existing manhole or sewer line to improve structural integrity and longevity. A new corbel may then be installed and bonded to the liner.

20 Claims, 7 Drawing Sheets

SYSTEMS AND METHODS FOR REHABILITATING, REPAIRING, AND REPLACING MANHOLES AND CONNECTED SEWER LINES

TECHNICAL FIELD

The present invention relates generally to a method for rehabilitating, repairing, and replacing the tunnels or passageways that make up the sewer system, and more specifically, to reinforcing the concrete or brick walls that make up the manholes and corresponding sewer systems by inserting a liner and treating the surfaces of the manhole to protect the sewer system from further deterioration.

BACKGROUND OF THE INVENTION

Deteriorating sewer systems is a significant problem in the United States and other countries across the globe. And the problem worsens as the sewer lines age and deteriorate. These sewer systems were originally built with brick and/or concrete walls and foundations that defined the sewer lines and manholes. Pipes may have been included for the sewer lines that connect the manholes throughout the sewer system. As the sewer systems age, the brick and concrete walls and foundations expand, compress, crack, and adjust, which creates holes and crevasses where water can enter, leak, or flow. Additionally, these adjustments in the walls and foundations can crack or break the pipes that make up the sewer lines. Gases and chemicals released from the sewage traveling therein can speed up this aging and deterioration process.

These deteriorating sewer systems create various problems for the cities and municipalities that are responsible for the upkeep of the sewer systems. Cities, municipalities, and utility companies are responsible for paying for sewer water to be processed and treated by a local treatment facility. And if a sanitary sewer system (sewers and storm drains are not combined) was installed, the costs of the treatment and processing of water can explode if storm water is infiltrating the sewer system because the city or municipality must pay for this additional water to be processed. Many cities built sanitary sewer systems and storm drains to funnel and direct storm water or water from a leak to the correct location because if it's not, the city has to pay for that water to be treated. Further, the cracking of the brick or concrete of the manholes and connected sewer lines leads to additional water seeping through the walls of the manholes and connected sewer lines, which leads to additional treatment costs.

These problems can also lead to flooding or overflow as the storm water backs up in the sewer system and fails to flow to the proper location for relief (i.e., storm drains). During this type of flooding, it can be difficult to funnel the water where it needs to go, and the manholes become impossible to access for relief or repairs. Sewage may back up into the streets of the city or municipality before the water can be treated. This can lead to an unfortunate situation where the storm water is mixed with sewage, which can lead to EPA problems, health concerns, and undesired smells.

The maintenance requirements vary with the type of sewer system involved, but all sewer systems deteriorate with age. The type of sewer system may also indicate a different level of maintenance required. Combined sewers and storm drains may require less maintenance, since the original water system was designed to carry both types of water, although sanitary sewer systems require additional maintenance due to the concerns mentioned above. Prior methods of preventing the flow or entrance of water into the sewer system may include directly fixing the cracks or fissures in the brick or concrete walls and repairing or replacing any damaged pipes or liners.

In the past, when sanitary sewer pipes or manholes cracked or experienced damages, the only option was an expensive excavation, removal, and replacement of the damaged pipe or manhole. This process typically required street repairs afterwards. Then a method was created to apply and coat a cement mixture to the sewer pipe or manhole, which was designed to seal the cracks and breaks in the pipe or manhole. Other prior methods include using a resin to re-line aged or damaged pipes and manholes. Another method of repair is called pipe bursting, wherein a new pipe is drawn through the old pipe behind an expander head that breaks apart the old pipe as the new one is drawn in behind. However, these methods may not be sufficient to improve the leaks, holes, and crevasses in the walls of the sewer lines and corresponding manholes. Aside from total replacement, these conventional repair methods are not a long-term fix. A cost-effective method to repair, refurbish, and/or replace the pipes and manholes of sewer systems is required.

BRIEF SUMMARY OF THE INVENTION

The present invention comprises a method for repairing, refurbishing, and/or replacing the pipes, tunnels, and corresponding manholes of a sewer system. The claimed method is designed to address the problems with aging and deteriorating sewer systems with an efficient solution that is superior and less expensive than prior methods.

In some embodiments, the initial step may include removing the existing corbel, including any prior liners that were located in the manhole. A compressed liner that will expand to fit in the manhole is inserted through an access hole or the connected sewer lines. Prior to insertion, the liner may be measured to fit properly in the manhole when expanded and then cut and/or folded to be compressed to a size that can fit through the manhole ring or the sewer lines. Once inserted in the manhole, the liner should be expanded and bonded together with a resin along the separation line to the desired fit. Apertures or holes can be made in the liner to account for sewer lines or inverts that need to pass water or sewage into the manhole or connected sewer lines. This bonding step may be unnecessary if the liner was compressed through other means (i.e., manipulation, folding, molding). Next, a bonding material is injected between the liner and the manhole surface to seal any cracks or fissures in the brick or concrete walls and to seal the liner against the existing manhole. A new corbel is then installed and bonded to the liner and concrete is poured over the corbel to grade. The new corbel can be bonded to the top of the liner. When expanded, the liner may have a larger internal volume than the compressed liner. This process may be used to repair or refurbish pipes or tunnels that make up the sewer lines.

In some embodiments, the bonding material may be applied to the manhole or sewer line surfaces initially to repair any cracks or fissures in the brick or concrete walls. Then the compressed liner is inserted into the manhole through the open top of the manhole or the open access for sewer lines. Once inserted, the liner is expanded and bonded together with a resin along the separation line. The expanded liner connects to the bonding material to seal the liner against the existing manhole or sewer lines and provides significant structural strength. A new corbel may then be installed and bonded to the liner.

A corbel liner may be applied to a manhole or sewer system in a similar fashion. A compressed corbel liner that will expand in the manhole is inserted through the open top of the manhole or connected sewer lines. Prior to insertion, the liner may be measured to fit properly in the manhole when expanded and cut and/or folded to be compressed to a size that can fit through the manhole ring or the sewer lines. Once inserted in the manhole, the liner should be expanded and bonded together with a resin along the separation line if necessary. A bonding material is injected between the liner and the old manhole to seal any cracks or fissures in the brick or concrete walls and to seal the liner against the existing manhole. When expanded, the corbel liner may have a larger internal volume than the compressed corbel liner.

In some embodiments, ports in the liner can be used to apply the bonding material between the liner and the surface of the manhole or sewer line. Apertures or holes can also be made in the liner to account for sewer lines or inverts that need to pass water or sewage into the manhole or connected sewer line. A container may also be used to deliver the compressed liner to the manhole or connected sewer line. More specifically, the compressed liner fits into the container for improved transportation through the manhole or the connected sewer lines.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

As mentioned above, a new method for repairing, refurbishing, and replacing existing manholes that have been aging and deteriorating is needed. The existing manholes and connected sewer systems are crumbling and cracking, which leads to high city and municipality costs for storm water entering the sewer system and expensive repairs to damaged manholes, lines, and pipes. A method that enables repair and replacement without expensive excavation and removal would be a vast improvement over the prior art. Further, a method is desired that would add structural strength to the manhole, repair the cracks and fissures in the walls, and create a water tight seal to prevent storm water from entering the sewer system. While this application focuses on manholes, sewer lines, and collection systems, the present invention could be used in other applications such as oil and gas delivery, chemical transportation, or water delivery.

Figure 1:
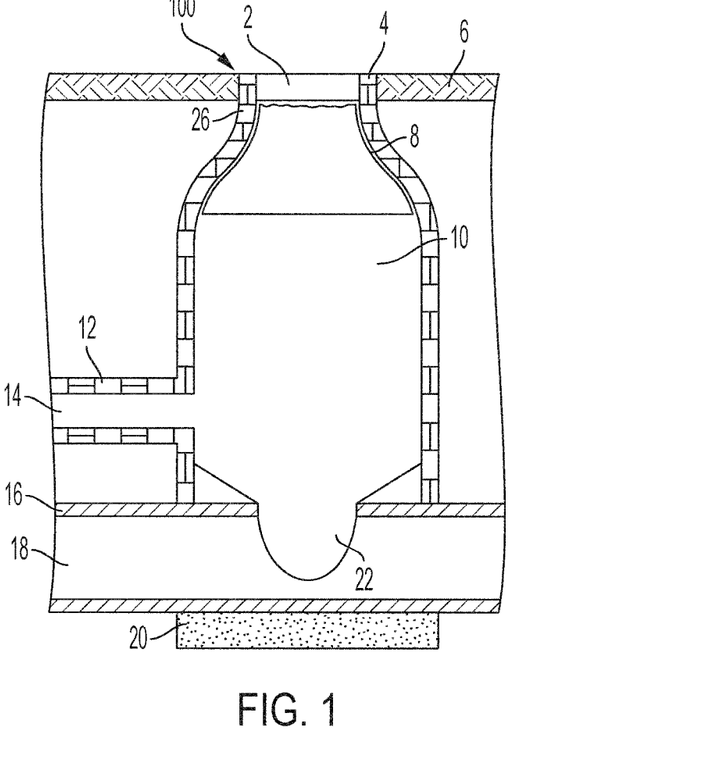
FIG. 1 shows a cross-section view of a manhole and a connected sewer system.

FIG. 1 shows a cross-sectional view of a manhole and connected sewer system 100. Manholes 100 are crucial because they enable workers to access the sewer system to make repairs or adjustments without having to excavate or dig up the entire surface and area surrounding the sewer system. A surface or road 6 lays on top of the manhole 100. When necessary, a worker can access the manhole 100 through a manhole cover 2 that covers an entrance to the manhole 100. When the manhole cover 2 is removed, the worker may access the portion of the manhole 10 that is below the surface or road 6. This area may be called the manhole access area and in some embodiments this area may be more open after removal of the corbel. As shown in FIG. 1, a diameter of the manhole cover 2 is smaller than a diameter of the internal manhole 100. A corbel 8 is a section of the manhole 100 that defines a transition from this smaller diameter to a larger diameter and provides support for the upper section of the manhole 100. A manhole ring 4 outlines the access point for the manhole 100 and provides support for the manhole cover 2. A reduced diameter lip 26 prevents the manhole cover 2 from dropping into the interior of the manhole 100. The manhole 100 of FIG. 1 is shown with brick walls, but concrete walls may also support and outline the manhole 100.

A diameter of the interior section of the manhole 10 is larger than the diameter of the manhole ring 4. This larger space enables a worker to work on or repair the manhole 100 below the surface or road 6. In some manholes like the one shown in FIG. 1, an opening 22 may exist at the bottom of the manhole 100 for access to the connected sewer line. A first sewer line or pipe 18 may be supported or outlined by a concrete or brick wall 16. A concrete base 20 may further support the manhole 100 and connected sewer system. Conventionally, a sewer system may have numerous inverts and pipes to carry and deliver waste water for treatment. A second sewer invert or pipe 14 may be supported or outlined by a concrete or brick 12 wall. During operation, the second sewer invert or pipe 14 may provide waste water for treatment to the first sewer line or pipe 18 through the opening 22 in the manhole 100. Then the first sewer invert or pipe 18 can deliver the waste water to the location for processing and treatment. The size of sewer inverts, pipes, or tunnels 18 can vary widely, and in certain sewer systems the pipes or tunnels 18 are large enough for workers to move through.

In many sewer systems the cost for treatment of waste water is calculated through a measurement in the pipes or tunnels that deliver the waste water to the treatment facility. For many applications, a sensor or sensor system is implanted in a primary invert, pipe, or tunnel leading to the treatment facility to measure the flow of water to the waste treatment facility. Then the city or municipality is contracted to pay a certain amount per volume of water to be treated at the treatment facility. Because the city or municipality would like to avoid paying treatment costs for storm water or water from a leak, it must prevent this water from entering the sewer system. Thus, a superior method for repairing, replacing, or refurbishing to prevent this leakage of storm water into the sewer system is desired.

Figure 2:
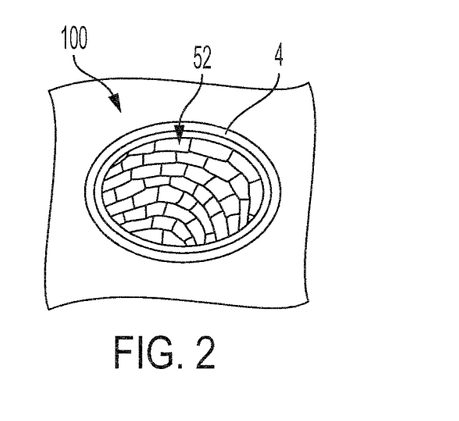
FIG. 2 shows a top view of a manhole that was made of brick.
Figure 3:
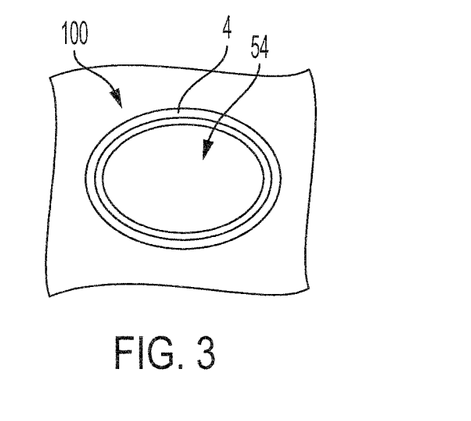
FIG. 3 shows a top view of a manhole that was made of concrete.

FIG. 2 shows a top view of a conventional manhole 100 that is made of brick and FIG. 3 shows a top view of a conventional manhole 100 that is made of concrete. In the views of FIG. 2 and FIG. 3, the manhole cover 2 (not shown) is removed to show an internal view of the manhole 2. FIG. 2 and FIG. 3 show the manhole ring 4 that outlines the access point for the manhole 100 and provides support for the manhole cover 2. Looking into the manhole 100 of FIG. 2, the brick shows a wall of a brick covered corbel 52, and looking into the manhole 100 of FIG. 3, the concrete shows a wall of a concrete corbel 54.

Figure 4:
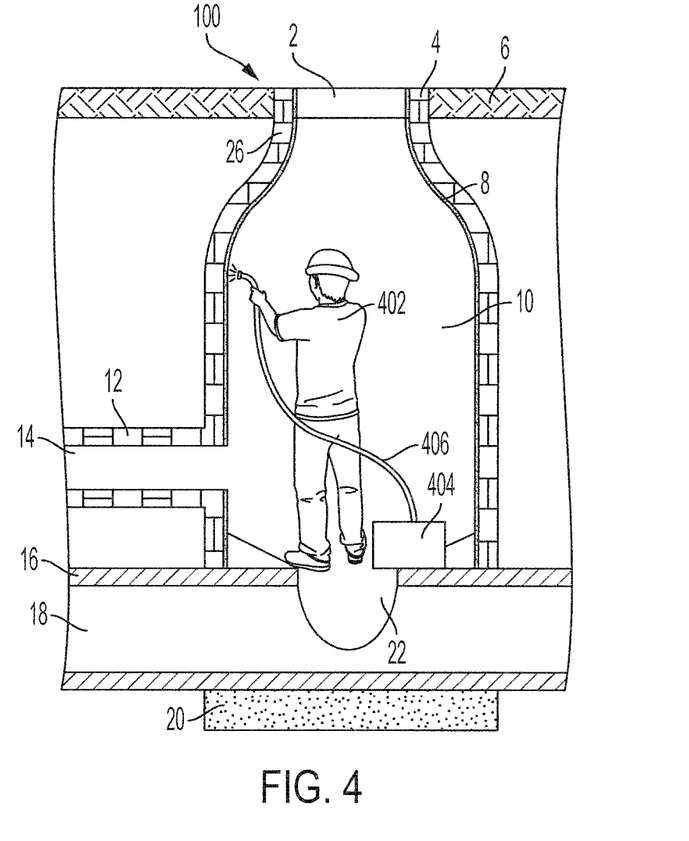
FIG. 4 shows a cross-section view of manhole and a connected sewer system that is being treated by conventional methods.

FIG. 4 shows a cross-sectional view of a manhole and connected sewer system 100 that is being treated by conventional methods. As mentioned above, the brick or concrete walls of aging manholes start to show cracks and deformations that can require repairs or refurbishment of the manhole. Conventional methods of repair have included applying a cementitious mixture to the interior portion of the manhole to seal or fill in this cracks or deformations. In the manhole 100 of FIG. 4, a worker 402 has gained access to the lower portion of the manhole 10. The worker 402 can access this area by removing the manhole cover 2 and entering the manhole 100 or by traveling through the sewer system in one or more sewer pipes or tunnels 18. The worker 402 has a spray container 404 and a spray hose 406 to apply a cementitious mixture to the walls of the manhole 100. After application by the worker 402, the cementitious mixture will harden to create an additional layer to the manhole 100. However, this may not improve the foundational problems because the cracking and deformation of the brick or cement walls may continue. This method also may fail to prevent water seepage into the sewer system. This is a temporary fix but not a great long-term solution.

Figure 5:
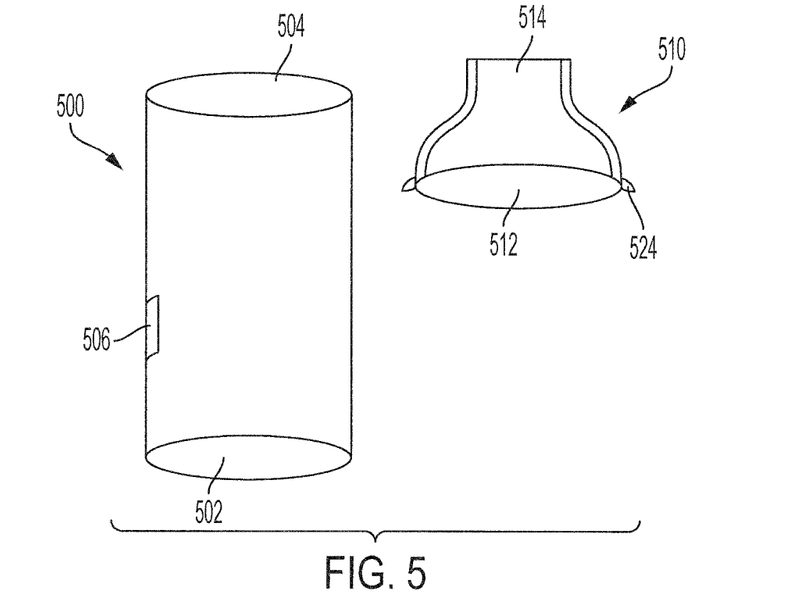
FIG. 5 shows a liner for a manhole including a cylindrical portion and a corbel portion.

FIG. 5 shows a liner with a cylindrical portion 500 and a corbel portion 510 that may be used with some embodiments of the claimed invention. A physical liner that can be inserted into the manhole or connected sewer pipe or tunnel can assist with integrity problems. The claimed invention covers other shapes and sizes of manholes and corresponding liners that will expand to the surfaces or edges of the manholes. The cylindrical portion 500 of the liner has a top side 504 and a bottom side 502. If this liner was used in the manhole 100 of FIG. 1, then the bottom side 502 would match up with the opening 22 and the top side 504 would match up with the corbel 8. An opening or aperture 506 may be added to the liner of FIG. 5 to accommodate a sewer line or pipe 12 (FIG. 1) once installed. The corbel portion 510 also has a top side 514 and a bottom side 512. If the liner was used in the manhole 100 of FIG. 1, then the bottom side 512 would line up with and may be bonded to the top side 504 of the cylindrical portion 500 and the top side 514 would line up with the manhole ring 4 (FIG. 1). The corbel liner 510 may also have a flange 524 that is used for mounting the corbel liner 510 to the corbel. After the liner of FIG. 5 is inserted in manhole 100 and the cylindrical portion 500 and corbel portion 510 are bonded together, the liner should provide an additional protective layer to the manhole and connected sewer system 100. The liner in the claimed invention may be made of various materials, but fiberglass or other plastic alternatives may be used in some embodiments. While FIG. 5 shows a cylindrical portion 500 of the liner, shapes such as a rectangular liner could be used if the manhole was designed with that shape.

With this basic understanding, the claimed invention focuses on a method for repairing or refurbishing aging manholes and connected sewer systems. This method may also be used to create or finish installation of manholes and connected sewer systems. Initially, the existing corbel of an aging manhole may be exposed and removed. This may involve excavating the surface or area around the corbel for access to the corbel. The manhole and connected sewer system that will be prepared may be pressure washed at this time. Then the cylindrical portion of the liner is inserted in the manhole. In some embodiments, this liner may be cut, divided, or compressed so that the liner can fit into the desired area of the manhole through the manhole access hole by way of the road or by way of the sewer pipes or tunnels. The liner shall then be expanded to align with and be adjacent to the features of the manhole. In some embodiments, this may include sealing or bonding the divided portions of the liner to achieve this expansion of the liner.

After the liner is expanded and in place within the manhole, a polymeric bonding elastomer may be injected between the liner and the manhole wall to bond the liner to the walls of the manhole. This injection may be done through ports in the liner or by injection through the top or bottom of the liner to create the bond between the liner and the walls of the manhole. Then the new corbel can be installed and bonded to the top of the cylindrical portion of the liner. This corbel may be new or the prior corbel may be reused. This process may include inserting a corbel portion of the liner, which is then bonded to the cylindrical portion of the liner. Installation of the new corbel may be in accordance with the manufacturer's recommendations for required load ratings. Lastly, concrete can be poured over the new corbel to grade and ensure that the surface or road is repaired and flat. Sewer lines may be treated in the same manner.

In some embodiments, the polymeric bonding elastomer may be applied to the manhole wall before the liner is installed and expanded. The expanded liner will then begin to bond with the manhole wall after expansion. If the liner was cut or divided before insertion in the manhole, then the worker or user can bond the divided portions of the liner together. The polymeric bonding elastomer may be AV-200/CR Flex Polyurethane or other similar material. This specific material has an average bond strength of 240-290 psi. Other bonding materials are within the scope of the present invention. In conventional methods, the liner couldn't expand to the surface of the manhole or the connected sewer lines and tunnels, so there was a space between the liner and the surface that needed to be filled. This space could be from 6 inches to larger distances. Conventional methods filled this space with concrete, but that did not foster the improved bonding and support that a liner/bonding elastomer combination does. Thus, the use of the bonding material and the reduced space between the liner and the surface provide significant improvements over the prior art.

Figure 6:
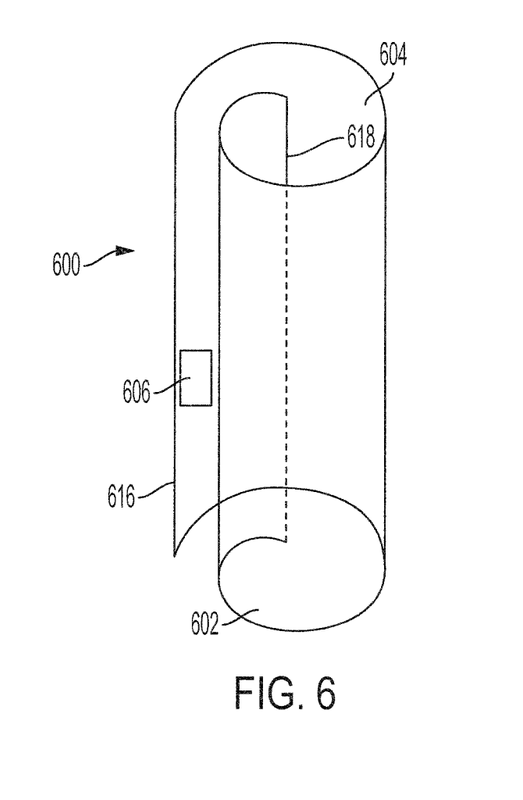
FIG. 6 shows a liner for a manhole including a cylindrical portion according to some embodiments of the claimed invention.
Figure 11:
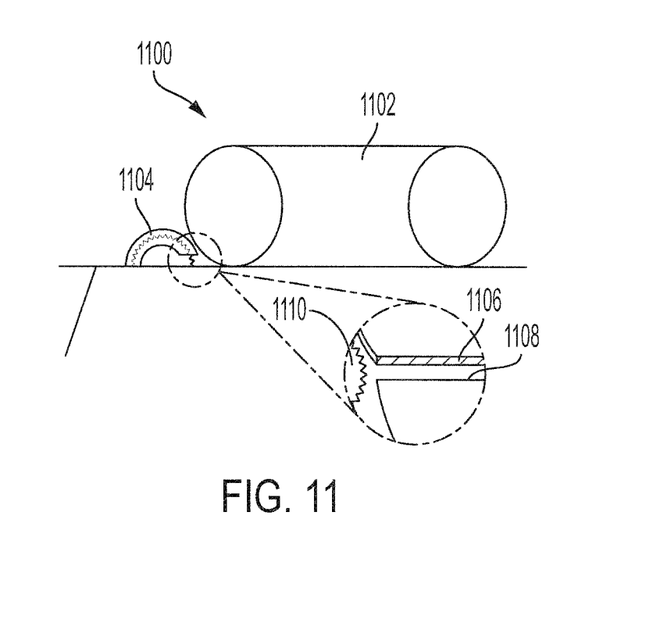
FIG. 11 shows a method for cutting or dividing a liner according to some embodiments of the claimed invention.

FIG. 6 shows a compressed liner for a manhole including a cylindrical portion 600. In this embodiment, the cylindrical portion 600 is laterally compressed. The cylindrical portion 600 has been cut or divided down a first edge 616 and a second edge 618. Similar to FIG. 5, the top side 604 of the cylindrical portion 600 aligns with the corbel, while the bottom side 602 would align with the opening 22 (not shown) at the bottom of the manhole 100. By making this cut down the length of the cylindrical portion 600, the diameter or width of the liner decreases significantly. The interior volume of the compressed cylindrical portion 600 is smaller than the interior volume of the expanded liner 500. This will allow the cylindrical portion 600 to fit downward through the exposed corbel section or upward through the sewer pipes or tunnels. In some embodiments, the corbel will be exposed and removed to leave an open section in the manhole. An opening or aperture 606 may be added to the liner of FIG. 6 to accommodate a sewer line, invert, or pipe 12 (FIG. 1) once installed. The liner in the claimed invention may be made of various materials, but fiberglass or other plastic alternatives may be used in some embodiments. The cylindrical portion 600 may also be compressed by cutting the liner into multiple portions. For example, two cuts down the length of the liner 600 would create two portions that could be compressed and then bonded within the manhole or sewer system. FIG. 11 shows how a worker may cut or divide this liner 600 for compression. Folding or manipulation may also be used to compress the liner. In other embodiments, a corbel liner may be cut and compressed in similar fashion to the cylindrical liner. Due to the shape of the corbel, it may be difficult to make a single cut to compress the corbel liner, so multiple cuts may be required. Folding or manipulation may be used to compress the corbel liner as well.

Figure 7:
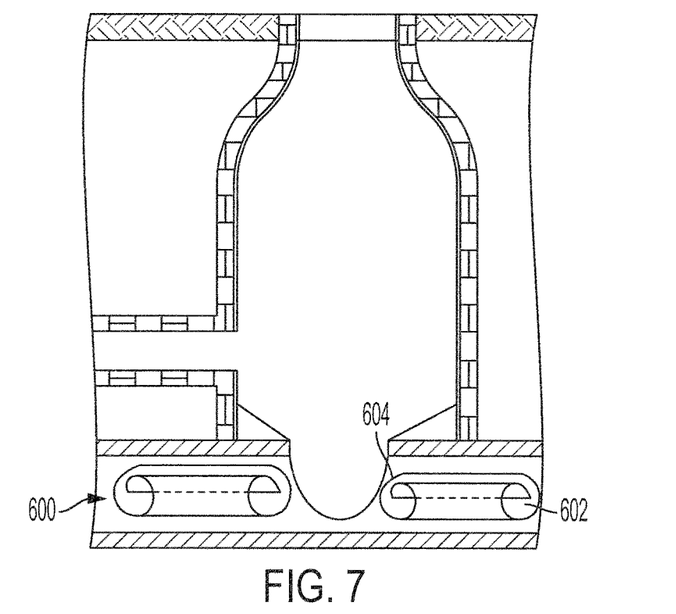
FIG. 7 shows a method for repairing and refurbishing a sewer system according to some embodiments of the claimed invention.
Figure 8:
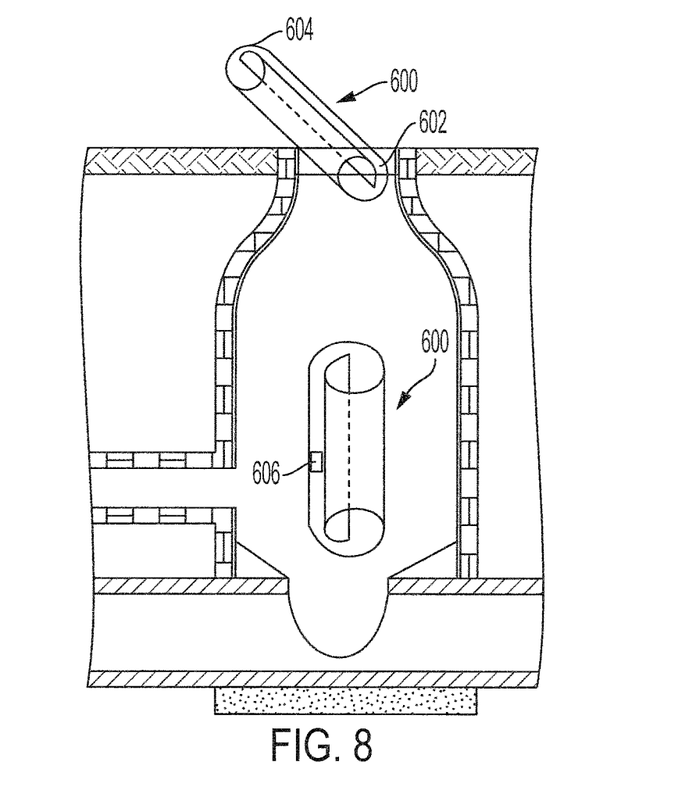
FIG. 8 shows an alternative method for repairing and refurbishing a manhole according to some embodiments of the claimed invention.

FIG. 7 shows a method for repairing and refurbishing a sewer system by transporting the compressed liner through the sewer pipes or tunnels and FIG. 8 shows an alternative method for repairing and refurbishing a manhole by transporting the compressed liner downward through the manhole access cover or removed corbel section. In this embodiment, the liner is laterally compressed. The compressed cylindrical portion 600 is shown in both FIGS. 7 and 8. In FIG. 7, the compressed cylindrical portion 600 is rolled, carried, or slid through the sewer pipe or tunnel until it reaches the desired area of the sewer line. Once there, it can be expanded to fit snugly against the walls of the sewer line, pipe, or tunnel. The bottom side 602 fits against the walls of the sewer pipe or tunnel further away from the manhole and the top side 604 fits against the walls of the sewer pipe near the opening of the manhole. In FIG. 8, the compressed cylindrical portion 600 is inserted into the desired manhole 100 where it can be expanded to fit snugly against the manhole wall. The bottom side 602 fits against the opening to the sewer pipe or tunnel and the top side 604 fits against the existing or new corbel (not shown). An opening or aperture 606 on the liner may accommodate a sewer invert or pipe 12 once installed. The liner 600 may not be drawn to scale in FIGS. 7 and 8, but when expanded these liners 600 should be adjacent to the surface of the manhole or sewer line. In some embodiments, the manhole and connected sewer system are pressure washed and evaluated before the liner is inserted. If there are any areas (bricks or concrete extending or protruding) in the manhole that would restrict or puncture the liner, then those areas may be prepared before the liner is dropped in the manhole. Insertion of a compressed corbel liner is not shown in FIG. 8, but this method is within the scope of the present invention.

Figure 9:
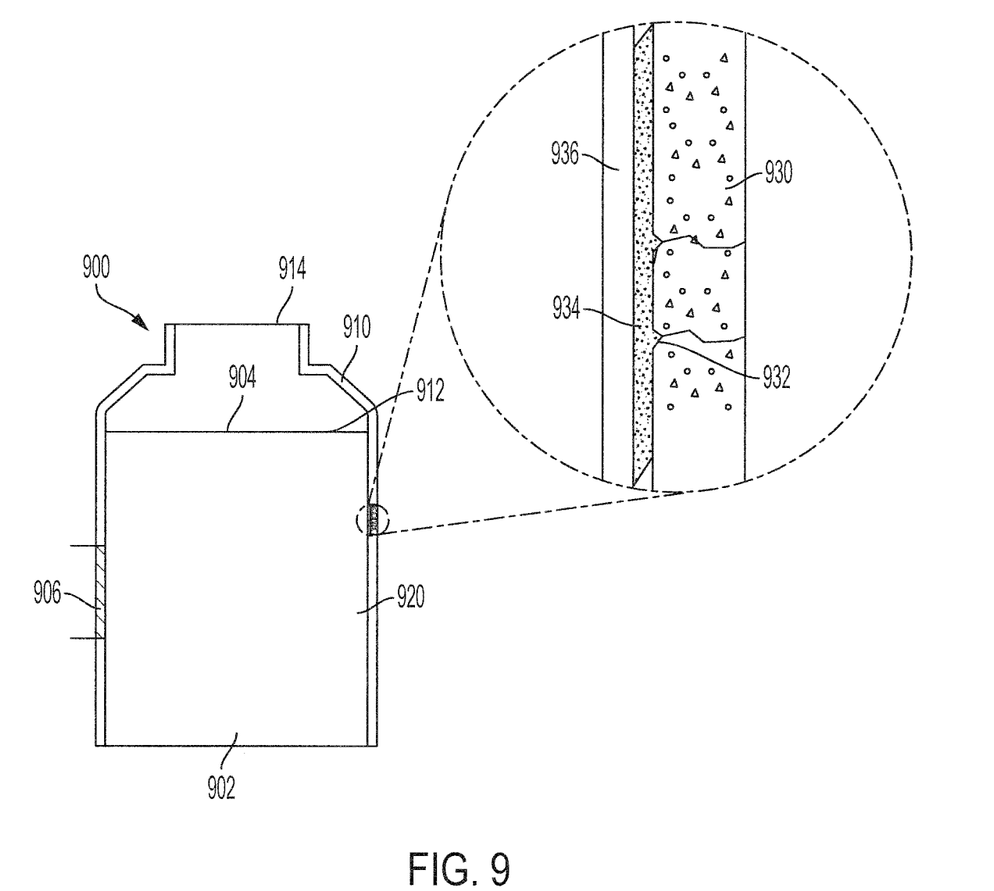
FIG. 9 shows a cross-section view of a repaired and refurbished manhole according to some embodiments of the claimed invention.

FIG. 9 shows a cross-section view of a repaired and refurbished manhole 900 according to some embodiments of the claimed invention. In this embodiment, a corbel portion 910 is shown on top of a cylindrical portion 920. The bottom side 902 of the cylindrical portion 920 lines up with the bottom of the manhole 100 and the top side 914 of the corbel portion 910 lines up with the manhole access cover (not shown). The top side 904 of the cylindrical portion 920 may be bonded to the bottom side 912 of the corbel portion 910. An opening or aperture 906 on the cylindrical portion 910 may accommodate a sewer line, invert, or pipe once installed. FIG. 9 also includes an exploded view of a cross section of the manhole 900. In this exploded view, the existing concrete manhole 930 exists outside of a liner 936 for the cylindrical portion 920 or the corbel portion 910. The liner 936 may be made of a fiberglass or other plastic material. The concrete 930 provides the wall for the manhole 900, but cracks or spaldings 932 begin to show in an aging manhole. As discussed above, an elastomeric bonding material 934 may be applied between the liner 936 and the concrete wall 930 to fill in or plug these cracks or spaldings 932. In some embodiments, the elastomeric bonding material 934 is applied before the liner 936 expands to the concrete wall 930, and in other embodiments, the elastomeric bonding material 934 is applied after the liner 936 expands to the concrete wall 930. In some embodiments, a void may be created between the liner 936 and the concrete 930 such that concrete or another bonding material may be applied to this void for a better fit between the liner 936 and the concrete 930.

The claimed invention offers numerous advantages over prior art methods of repairing, refurbishing, and replacing existing manholes. This method provides water tight seals and prevents leaks in the existing manhole wall, which should prevent water from flowing to unintended locations. Cracks and voids within the original manhole should be sealed as the material is injected. The inserted liner and bonding material injected into the brick or cement manhole adds structural strength in both the vertical and horizontal directions. The outward pressure on expansion and the improved bonding between the bonding material and liner significantly improve the structural strength. The bonding material further prevents chemical deterioration to the cement materials and allows for movement or shifting of the wall. This bonding material should not be affected by waste water and/or gases produced by the sewage, which should assist at protecting the brick and cement wall of the manhole and connected sewer lines as time passes. In some embodiments, the flexible liner allows for movement or shifting of the wall without breaking or cracking.

Further, cost advantages will be realized by the city or municipality that adopts the claimed method. Infiltration of water, dirt, and debris in the repaired manhole and sewer pipes will be reduced or eliminated, which reduces or eliminates sewage overflow. Waste water treatment costs will be reduced because the storm water will not seep into the sewage lines forcing the city or municipality to pay for the treatment of storm water or water from a leak. Solid waste disposal costs may also be reduced because any soil or sand that would be carried into the system by infiltration should be reduced. The claimed method should also reduce soil seepage caused by infiltration in the manhole and surrounding wall. Further, the claimed method can be accomplished during normal operation of the sewage system without the need for expensive excavation.

The claimed process may improve the life span of the manhole and corresponding sewer lines, thus requiring less repair and replacement in the future. The liner, which may consist of fiberglass or other plastic material, in combination with the elastomeric bonding material, provides a more flexible material that reduces cracks and spaldings in the concrete wall. The claimed invention may lead to up to 50% savings in repairing, refurbishing, and replacing aging manholes.

Figure 10:
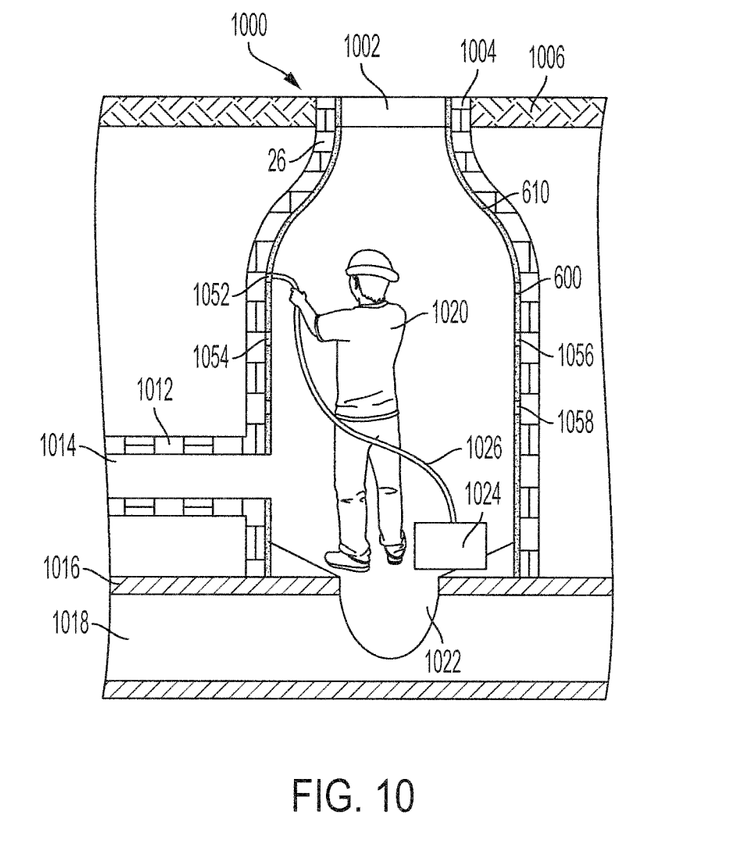
FIG. 10 shows a method for repairing and refurbishing a manhole according to some embodiments of the claimed invention.

FIG. 10 shows a method for repairing or refurbishing a manhole 1000 according to certain embodiments of the claimed invention. The surface or road 1006 leads to a manhole ring 1004 and a manhole cover 1002 that can be removed to access the manhole 1000 below. In FIG. 10, a worker 1020 has gained access to the lower portion of the manhole 1000. The worker 1020 can access this area by removing the manhole cover 1002 and entering the manhole 1000 or by traveling through the sewer system in one or more sewer pipes or tunnels 1018. An opening 1022 at the bottom of the manhole 1000 connects to a sewer pipe or tunnel 1018, which is outlined by a concrete wall or pipe 1016. An invert or pipe 1014 and corresponding concrete wall or pipe 1012 is connected to the manhole. The worker 1020 has a spray container 1024 and a hose 1026 to apply a mixture to the walls of the manhole 1000. In some embodiments, the mixture may be an elastomeric bonding material. The spray container 1024 may also be outside of the manhole 1000 and connected to a hose 1026. The spray container 1024 may also consist of two containers that mix the materials before it is applied to the manhole. An expanded cylindrical portion 600 (FIG. 6) abuts the concrete wall of the manhole 1000. In this embodiment, the liner 600 has already been expanded and the two sides have been bonded together and the elastomeric bonding material must be applied to improve the structural integrity of the wall and bond the liner thereto. In contrast to FIG. 4, an expanded liner is adjacent to the manhole or sewer line wall in FIG. 10.

To apply the elastomeric bonding material, ports 1052, 1054, 1056, 1058 are created or drilled in the liners 600, 610 (corbel liner). A corbel liner 610 is also shown in FIG. 10. This may be done before or after insertion and expansion of the liners 600, 610. The worker 1020 can then use the hose 1026 to apply the elastomeric bonding material in between the concrete wall and the liners 600, 610. The elastomeric bonding material will fill the voids in the wall and voids between the liner and the wall until it spills back out of the port 1052, 1054, 1056, 1058. At this point, the worker 1020 can seal that port 1052, 1054, 1056, 1058 and move to the next port to apply the elastomeric bonding material. Once the material has been applied to all the ports, the liner 600, 610 will be bonded to the concrete wall and the manhole will be repaired and refurbished after the bonding material dries and sets.

FIG. 11 shows a method 1100 for cutting or dividing a liner 1102 according to some embodiments of the claimed invention. In FIG. 11, a saw 1104 is set up on a horizontal surface for cutting or dividing the liner 1102. In this figure, the liner 1102 is the cylindrical portion, but the corbel portion can also be cut or divided in this fashion. In an exploded view, the saw blade 1110 is shown cutting through the liner 1102 to create a first edge 1106 and a second edge 1108. In some embodiments, the cut between the first edge 1106 and the second edge 1108 may be a 10° to 90° cut. A 90° cut will provide less surface area for bonding the first edge 1106 to the second edge 1108 than a 10° cut. Thus, in some embodiments a lower degree cut may provide additional surface area for bonding the first edge 1106 to the second edge 1108, which may lead to a stronger bond when the liner 1102 is expanded and reattached. The claimed invention covers other methods for dividing or cutting the liner, and in some embodiments, the liner is compressed when created. Folding or manipulation may also be used to compress the liner.

Figure 12:
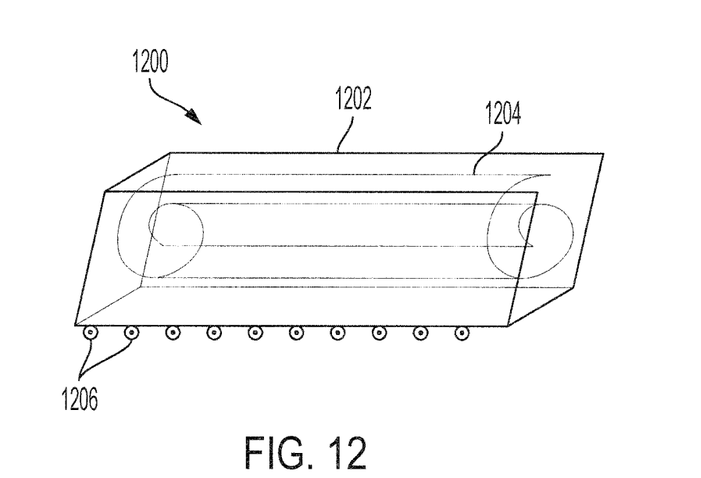
FIG. 12 shows a method for transporting a compressed liner according to some embodiments of the claimed invention.

FIG. 12 shows a method 1200 for transporting a compressed liner 1204 according to some embodiments of the claimed invention. The liner may be cut and compressed on site and can be compressed by using several methods. In FIG. 12, a compressed liner 1204 fits into a container or jig 1202 for transportation. The container or jig 1202 may have wheels or rollers 1206 for making the container or jig 1202 easy to transport. The container or jig 1202 can also compress the liner 1204 to the desired width or size. In FIG. 12, the container or jig 1202 is open on the top and the front side, but other embodiments are within the scope of this invention. With this type of container or jig 1202, the compressed liner 1204 can be delivered to the manhole (not shown) through the manhole access cover or through the sewer pipes or tunnels. Delivery of the compressed liner 1204 to the manhole may improve with this container or jig 1202. The container or jig 1202 can be various sizes and shapes but should be adapted for the manhole or sewer pipe or tunnel that will be repaired for refurbished. In some embodiments, the container or jig 1202 can be easily adjusted or sized based upon the desired length, width, and depth required. A pulley system or other means may also be used to transport the liner 1204 and/or the container or jig 1202 to the desired location.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of improving a sewer system comprising the steps of:
   inserting a compressed liner into said sewer system, said compressed liner having a first edge and a second edge;
   expanding said liner to be adjacent to a surface of said sewer system;
   connecting said first edge of said expanded liner to said second edge of said expanded liner by bonding said first edge to said second edge; and
   injecting a bonding elastomer between said expanded liner and said surface of said sewer system to connect said expanded liner to said surface of said sewer system.

2. The method of claim 1 further comprising the steps of:
   removing a first corbel from a manhole of said sewer system;
   installing a second corbel; and
   bonding said second corbel to said expanded liner.

3. The method of claim 1 further comprising the steps of:
   inserting a compressed corbel liner into a manhole of said sewer system, said compressed corbel liner having a first edge and a second edge;
   expanding said corbel liner to be adjacent to a surface of a corbel of said sewer system;
   connecting said first edge of said expanded corbel liner to said second edge of said expanded corbel liner; and injecting a bonding elastomer between said expanded corbel liner and said surface of said corbel to connect said expanded corbel liner to said surface of said manhole.

4. The method of claim 1 further comprising the step of compressing a liner by separating said liner to create said first edge and said second edge and then laterally compressing said liner.

5. The method of claim 4 wherein said liner is a rigid cylindrical liner.

6. The method of claim 5 wherein said step of connecting further comprises recreating a rigid expanded liner.

7. The method of claim 1 further comprising the step of installing at least one port in said compressed liner for injection of said bonding elastomer between said expanded liner and said surface of said sewer system.

8. The method of claim 7 further comprising the step of sealing said at least one port after said injection of said bonding elastomer between said expanded liner and said surface of said sewer system.

9. A method of improving a sewer system comprising the steps of:
applying a bonding elastomer to a surface of said sewer system;
inserting a laterally compressed liner into said sewer system, wherein said compressed liner comprises a first edge and a second edge;
expanding said liner to be adjacent to said surface of said sewer system;
connecting said first edge of an expanded liner to said second edge of said expanded liner; and
contacting said expanded liner to said bonding elastomer to bond said expanded liner to said surface of said sewer system.

10. The method of claim 9 further comprising the steps of:
inserting a compressed corbel liner into said sewer system adjacent to a manhole access area, said compressed corbel liner having a first edge and a second edge;
expanding said corbel liner to be adjacent to a surface of said sewer system; and
connecting said first edge of said expanded corbel liner to said second edge of said expanded corbel liner.

11. The method of claim 10 further comprising connecting said expanded liner to a corbel that is adjacent to said manhole access area.

12. The method of claim 9 further comprising the step of placing said compressed liner into a container for insertion into said sewer system.

13. The method of claim 10 further comprising the step of placing said compressed corbel liner into a container for insertion into said sewer system.

14. A method of improving a sewer system comprising the steps of:
inserting a laterally compressed liner with a first edge and a second edge into said sewer system;
expanding said compressed liner to be adjacent to a surface of said sewer system;
adhering said first edge and said second edge to create a rigid expanded liner; and
injecting a bonding elastomer between said expanded liner and said surface of said sewer system to connect said expanded liner to said surface of said sewer system.

15. The method of claim 14 further comprising the step of compressing said liner by separating said liner to create said first edge and said second edge and then laterally compressing said liner.

16. The method of claim 14 further comprising the steps of:
inserting a compressed corbel liner into said sewer system adjacent to a corbel;
expanding said corbel liner to be adjacent to a surface of said sewer system; and
injecting a bonding elastomer between said expanded corbel liner and said surface of said sewer system to bond said expanded corbel liner to said surface of said sewer system.

17. The method of claim 16 further comprising the step of connecting said expanded corbel liner to said expanded liner.

18. The method of claim 14 wherein the step of injecting a bonding elastomer further comprises injecting said bonding elastomer through a port in said expanded liner.

19. The method of claim 18 further comprising the step of sealing said at least one port after said injection of said bonding elastomer between said expanded liner and said surface of said sewer system.

20. The method of claim 14 further comprising the step of placing said compressed liner into a container for insertion into said sewer system.

* * * * *